Patented July 5, 1932

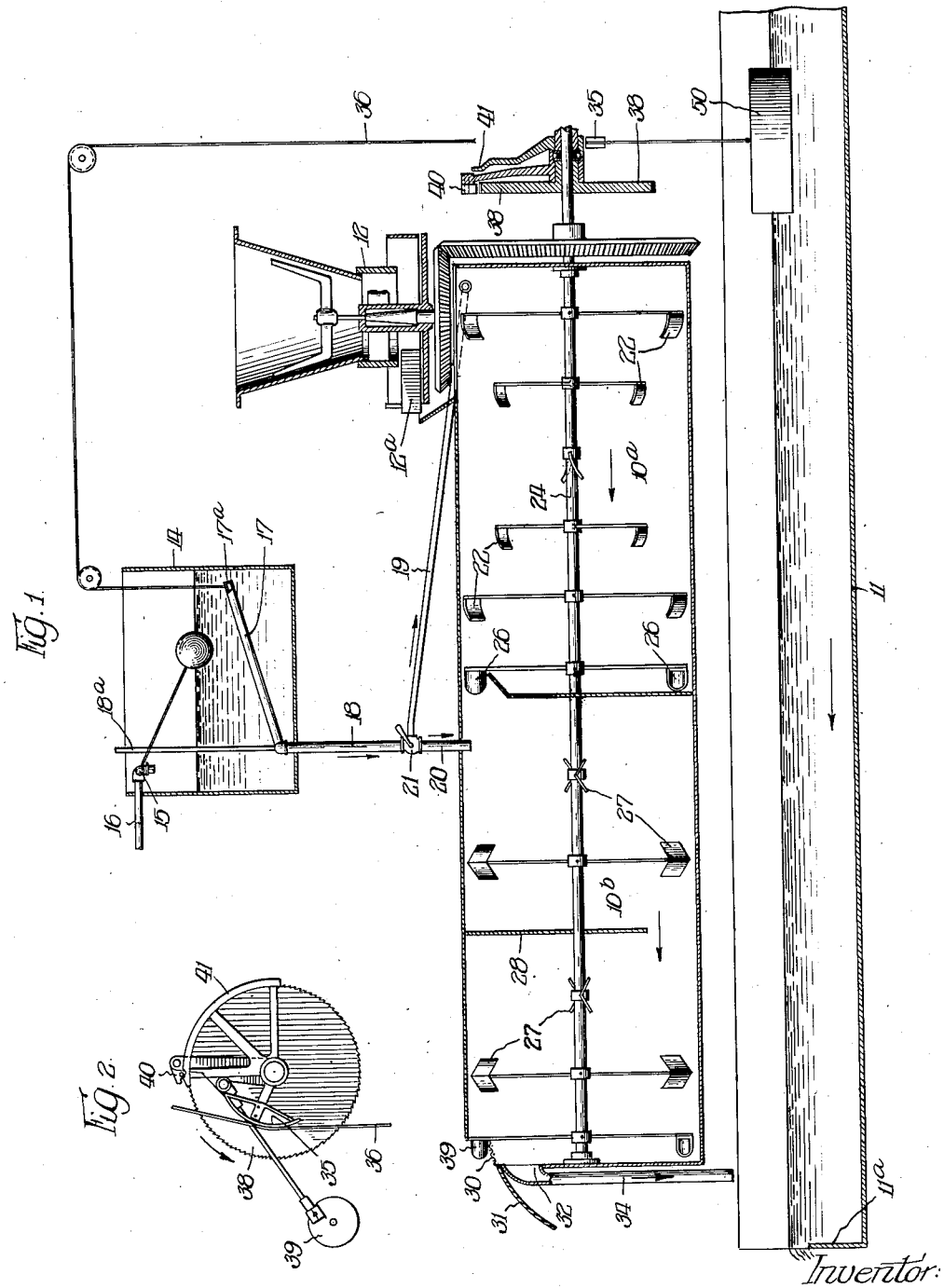

1,866,031

UNITED STATES PATENT OFFICE

WALTER H. GREEN, OF CHICAGO, ILLINOIS, ASSIGNOR TO GENERAL ZEOLITE COMPANY, OF CHICAGO, ILLINOIS, A CORPORATION OF ILLINOIS

LIQUID TREATMENT

Original application filed December 15, 1924, Serial No. 755,837. Divided and this application filed May 31, 1929. Serial No. 367,254.

This invention relates to proportionate feed apparatus for combining different materials in predetermined proportions and in which the rate of supply of one of the materials is regulated or controlled in accordance with the rate of supply of the other, so that the combining of the materials may be carried on continuously and in constant proportion. It finds a particular application in the feeding of reagents to water, incident to treatment for removal of hardening or scale forming ingredients. It has to do, however, with more than the mere proportioning of the materials, as it involves also the preparation of the treating or dosing mixture, with the purpose of controlling or regulating the rate at which it is prepared, in accordance with the rate of supply of the water to be treated.

The rate at which water is supplied for commercial use, such as for steam making, laundering or the like, is subject to variation in the demand or requirements and in the supply pressure. Proper and uniform treatment of the water requires uniformity in the proportioning of the treating material to the raw water. Of course a large supply of treating material may be made up ahead of time to be drawn upon in accordance with the momentary demand over a period of time. That procedure, however, requires a large storage space for the prepared materials and a fore-hand knowledge of the approximate requirements.

It is an object of the present invention to obtain the desired result in proportionate combining of materials more directly, by controlling the preparation of the treating mixture directly from the raw commercial materials. The material most generally used in the treatment of water is lime. In its hydrated form this material may be handled with comparative facility in the preparation of a suitable mixture which constitutes the reagent with which the raw water is dosed. Considerations of economy, however, urge the purchase of the lime in the unhydrated form, as it is more economical both in purchase price and cost of transportation.

Another important object of the invention is to provide an apparatus for the preparation of a suitable treating mixture from unslaked or slaked lime by method of procedure which is continuous, sufficiently rapid to meet the requirements of the water supplied for treatment and susceptible of automatic control in accordance with the rate at which the water is supplied.

Inasmuch as unslaked lime in its crude commercial form sometime contains more or less refuse matter in the form of gravel, sand and unreduced limestone, in a preferred embodiment provision is made for the separation of these from the end product.

Other and further objects of the invention will be pointed out hereinafter, indicated in the appended claims or obvious to one skilled in the art upon an understanding of the present disclosure. For the purpose of this application I have elected to explain the invention by reference to an illustrative structure. It is to be understood, however, that the representation of means is merely diagrammatic or schematic, as the results may be attained in substantially the same fashion by various organizations of divers mechanical elements and devices now known in the art.

In the drawing forming a part of this specification:

Fig. 1 is a diagrammatic illustration representative of a longitudinal sectional elevation of apparatus illustrating the practice of the invention;

Fig. 2 is an elevation detail of speed control mechanism.

The nature of the invention probably will best be understood by reference to the illustrative means. Referring to the drawing, let it be understood that the numeral 10 designates a tank of horizontal elongated proportion and of semi-cylindrical sectional form. Reference character 11 designates a conduit or handling container for raw water supplied for treatment which is provided with an overflow 11ª. Reference character 12 designates generally a feeding device operable to feed lime into the tank 10, the rate of feed being determined by the speed at which the device is operated and the adjustment of a discharge element 12ª. A device of this general type is known in the art, but it is here presented simply as illustrative of any suitable form of controlled feed supply mechanism. Reference numeral 14 designates a water supply apparatus, the same being represented in the form of a tank in which a constant level of water is maintained through operation of the float controlled valve 15 of a supply line 16. This water supply device includes a variable discharge element 17, represented as a swinging outlet pipe, the inlet end of which is provided with an inlet orifice and may be raised and lowered in the water in tank 14 so as to vary the head on the orifice and thereby vary the rate of discharge therethrough. Water discharged through pipe 17 is delivered to pipe 18 and divided between pipes 19 and 20 in accordance with the setting of a regulating valve 21. Pipe 18 has an air vent 18$^a$ to allow for air compensation in pipes 17 and 18. Pipe 19 leads to the supply end of the tank 10, so that the water delivered thereby will be brought into contact with the unslaked lime supplied by the device 12. The setting of the regulating valve 21 is such as to apportion to the pipe 19 and amount of water adequate to hydrate the lime at the rate at which it is supplied by the supply mechanism 12, and to form a plastic mixture with it. In one embodiment insufficient water is added to reduce the heat generated by the reaction of the water and the lime. This amount of water is usually less than that necessary to form the desired treating material, and the purpose of so limiting it is to permit the slaking process to proceed at the most expeditious rate. The final mixture is apt to be a rather thick mass, somewhere between a putty and a milk of lime. The water and the lime are agitated and mixed together by stirring members 22 which are actuated by the shaft 24. These stirring members are formed so as to induce a gradual progressive feed of material away from the supply end of the tank and toward a partition 25. The length of the tanks is such that when the mixture reaches the partition 25 it is in a uniform plastic condition and the lime is hydrated. The shaft actuates the revolving dippers 26 which dip the mixture out of the slaking compartment 10$^a$ and discharge it over the partition 25 into the mixing compartment 10$^b$. The discharge capacity of the dippers 26 is adequate to handle the maximum supply capacity of the mechanism 12 and pipe 19 during a given period of time at a correlative speed.

The capacity of the dippers to discharge material from compartment 10$^a$ must be greater than the rate of supply of materials into the compartment. This is so that there will be no tendency for material to collect in quantities in chamber 10$^a$. The material should be discharged from 10$^a$ as soon as the slaking operation has been completed. The actual discharge capacity of the dippers 26 depends upon the rate of revolution in the shaft 24 and size of the dippers. The rate of revolution in this shaft is proportionate to the rate at which the materials are supplied to slaking chamber 10$^a$. There is no limit to the size or holding capacity of the dippers 26, except a restriction due to the size of the apparatus, for they cannot feed material out of chamber 10$^a$ any faster than it comes to them. In preferred construction they should come up about half or two thirds full. It is important that they should never come up completely filled, incapable of elevating and transferring more material since if this was the case there would be inevitably a building up of materials in the chamber 10$^a$. Since the material produced in 10$^a$ is apt to be a rather thick mess, it is desirable to thin it down as is done in 10$^b$ before feeding it to the water. In 10$^b$ the mixture is diluted with a much larger proportion of water, supplied through the pipe 20, and stirred up by the action of the beaters 27 to form a homogeneous liquid, or milk of lime, which it is now qualified to do readily by virtue of the hydrated condition of the lime. The amount of water supplied through pipe 20 need not be apportioned to that supplied through pipe 19, and if desired it may receive its water supply from an independent source. If desired, the water flowing through 11 may be utilized as the diluting water. This milk of lime seeks its level in the mixing compartment 10$^b$, the baffle 28 being interposed in the compartment to prevent the passage of the incoming water directly to the discharge end of the compartment. Any refuse, such as gravel or sand, which is fed in with the unslaked lime, is fed along with the materials incident to the slaking operation in compartment 10$^a$, and is discharged therewith into compartment 10$^b$. In the latter compartment it sinks to the bottom of the tank, and is fed along the same gradually by the action of the beaters, passing under the baffle 28, and ultimately reaches the discharge end of the tank. Here it is picked up, little by little, by the revolving dippers 29 and discharged over the screen 30 to the chute 31, by which it is conducted off, any of milk of lime taken up by the dippers returning to the tank through the screen. If the unslaked lime is clean, however, of if gravel, sand or refuse may be readily separated from the dosed water, these means may be omitted. Tank 10 is provided with a discharge over a long horizontal edge 32 across the width of the tank, which permits passage of the treating mixture from the compartment 10$^b$ to the feed pipe 34, whence it is conducted to the water to be treated. Obviously the rate of discharge over the edge 32 will depend upon the rate at which materials are supplied into compartment 10$^b$. This is determined by the rate of supply from the feeding means 12 and tank 14. The rate of feed of the slaked lime to compartment 10ª is dependent on the speed of the shaft 24, and the setting of the element 12ª, while the rate of water feed is dependent on the elevation of pipe 17. Consequently, in order to accommodate the varying requirements for treating liquid, there must be variations in the rate at which the unslacked lime and the water are supplied to the mixing compartments. The latter is taken care of by the adjustment of the orifice 17ª at the end of pipe 17. The amount of liquid flowing into pipe 17 through the orifice 17ª will be controlled by the elevation of the orifice in the tank 14. The elevation will determine the head of liquid upon the orifice 17ª at the end of pipe 17. There is provided a free discharge of water into the air at the outlet side of the orifice (that is on the inside of the pipe) and this will continue so long as the pipe 17 and the other pipes farther on are sufficiently large so that the liquid flowing through the orifice is carried away without filling them. Since a restriction may be introduced farther along the pipe by the valve 21 the vent 18ª is provided attached to top of pipe 18 and extending above the liquid level in 14. This will admit air into pipe 18. As long as the valve 21 is open sufficiently to permit the liquid to discharge through it faster than it enters the orifice 17, the variation in water supply will be controlled satisfactory. The variations in the rate of supply of unslaked lime are taken care of by variations in the speed of the supply mechanism 12. The latter is made to vary with the speed of the shaft 24, which speed also determines the rate at which the materials are fed longitudinally in the slaking compartment 10ª and delivered to compartment 10ᵇ.

In order that these variations, which have the final objective of varying the rate of discharge of the treating mixture from mixing compartment 10ᵇ, may be effected automatically and in accordance with the variations in the rate of raw water supply, regulating mechanism is provided which is responsive to the rate of water supply. If the raw water supply is constant, however, it is possible to make a constant manual setting of the slaking and diluting apparatus. This is illustrated by the float 50 which rises and falls with variations in the water supply, and which is connected by suitable transmission means 36 with the discharge pipe 17 and with speed control mechanism which regulated the speed of the shaft 24. The speed control mechanism is represented in Fig. 2 by ratchet wheel 38 connected with shaft 24, an actuating wheel 39 which is constantly driven from a suitable source of power to oscillate a dog 40 to rotate the ratchet wheel, and throw-off element 41, the position of which is variable to regulate the effective throw of the dog through movement of a sector plate 35 by the transmission means 36. The amount of friction encountered by the transmission means 36 in passing over the pulleys and the sector plate 35 will prevent any movement thereof without a change in the level of the liquid in the tank 11 and a resultant change in the position of the float 50. The transmission means 36, which consists of a wire or cord is maintained in such frictional relationship with the sector 35 that a movement of the transmission means 36 will result in a corresponding movement of the sector 35. Since the sector 35 is rigidly attached to the throw-off element 41, the throw-off element will be correspondingly shifted in position with every movement of the transmission means 36. The position of the throw-off element 41 will determine the amount of movement of the ratchet wheel 38. The movement of the ratchet wheel 38 results from the movement of the dog 40 to the left while in operating engagement with the teeth on the periphery of the ratchet wheel 38. The movement of the dog is constant but the portion of the movement in which it is in operating engagement with the ratchet wheel 38 may be varied by changing the position of the element 41. If the throw-off element 41 were moved further to the left than as shown in Fig. 2, the portion of the throw of the dog 40 in which it was in engagement with the ratchet wheel 38 would be decreased. It is possible to move the element 41 far enough to the left so that the dog 40 will be kept out of engagement with the ratchet wheel 38 during its entire movement. This would result in a stoppage of the apparatus. On the other hand, if the throw-off element 41 were moved farther to the right, than shown in Fig. 2, the motion of the ratchet wheel 38 would be increased since the dog 40 would be in actuating contact therewith for a greater arc. It is apparent that if the element 41 is moved far enough to the right, it would be possible for the dog 40 to be in actuating relation with the ratchet wheel 38 during its entire leftward movement.

The operation of the speed regulating devices shown upon Figs. 1 and 2 is readily apparent. The liquid in the container 11 represents the raw water. The raw water flows toward the left and milk of lime, or if the raw water itself is utilized as the diluting agent, the hydrated lime paste or plastic mass, is added to it at a point below the pipe 34. The mixture finally flows over a weir or some other retarding means 11ª at the left end of the container 11. The level of liquid in the container or conduit 11 will correspond to the rate of flow therein and will bear some fixed relationship thereto.

If the flow through 11 is not substantially constant, it is usually desirable to vary the feed of the dosing agent. With an increased rate of flow it is desirable to add more milk of lime to the water while with a decreased rate of flow it will be desirable to add less milk of lime to the water. This is accomplished in the following manner: If there is an increased rate of flow, the level in the container or conduit 11 will be higher, raising the float 50. Whereupon the transmission means 36 will move the throw-off element 41 to the right (see Fig. 2) and at the same time will cause a lowering of the inlet orifice 17$^a$ of pipe 17 in tank 14. The movement of the throw-off element 41 to the right will cause the dog to remain in actuating engagement with the wheel 38 for a longer portion of its throw. This will cause a faster movement of shaft 24 and an increase in the rate of feed of lime to the chamber 10$^a$. The lowering of the orifice 17$^a$ will also increase the head of liquid thereupon, which in turn will increase the amount of water flowing down through lines 18, 19 and 20. As a result, more lime will be slaked in chamber 10$^a$, more slaked lime will be converted into milk of lime in chamber 10$^b$, and more milk of lime will flow over the orifice 32 into the conduit 34 and finally into the raw water passing through the conduit 11.

If the raw water passing through the conduit or container 11 decreases, the level of liquid will decrease and the float 50 will be lowered. Whereupon the transmission means 36 will elevate the swinging pipe 17 and will move the throw-off element 41 to the left. The elevation of the inlet orifice in the swinging pipe 17 will decrease the head thereupon and result in a decreased flow of slaking and diluting water through lines 19 and 20 respectively. The movement of the throw-off element 41 to the left will decrease the arc in which the dog 14 is in actuating engagement with the ratchet wheel 38 and this will decrease the speed of the shaft 24. With the decrease in the speed of the shaft 24, less unslaked lime will be fed into the slaking chamber 10$^a$, less slaked lime will be fed into the diluting chamber or milk of lime chamber 10$^b$ by means of the cups 26, and less milk of lime will flow over the horizontal orifice 32 to be intermixed with the water flowing through the conduit 11. When the flow of liquid through the conduit 11 has ceased, the float 50 will ride in such a lowered position that the transmission means 36 will lift the orifice 17$^a$ out of the body of liquid in the basin 14 and will also move the throw-off element 41 a sufficient distance to the left to prevent the dog 40 from coming into actuating engagement with the ratchet wheel at any portion of its throw. As a result, no water will flow through lines 18, 19 or 20, no unslaked lime will be fed into the slaking chamber 10$^a$ and no slaked lime will be fed into the diluting chamber 10$^b$. The power shaft on which the power wheel 39 is positioned is separately controlled and may also be stopped by means not shown.

As long as the dog 40 is out of actuating engagement with the ratchet wheel 38 no movement of the shaft 24 will take place since the pedals are immersed in thick heavy lime in chamber 10$^a$. The resistance of the lime in chamber 10$^a$ and the liquid in semi-solid in chamber 10$^b$ will be sufficient to stop rotation immediately upon release of the pawl or dog 40.

It will be noted that in the embodiment of the drawing not only the supply of raw materials is automatically regulated and controlled in accordance with the variations and supply of raw water, but also the rate at which the materials are transmitted through the apparatus and the refuse removed is controlled thereby. The final result is the automatic control of the feed of the dosing mixture to the raw water in accordance with the rate at which the latter is supplied.

Of course, it is not essential that the regulation of the lime and water feed be controlled automatically for it is evident the apparatus can be set manually to feed at the desired rate. By a fixed setting of means 36 or of the element 41 and pipe 17, so as to eliminate the control by float 50, the feed of material may be held constant, with the result that the discharge from compartment 10$^a$ or 10$^b$ will be held constant. In such arrangement, it will be observed, the feed of the treating material is controlled by the rate of feed of the unslaked lime and water to the apparatus. It is also possible to combine chambers or compartments 10$^a$ and 10$^b$ into one compartment and also they may be separated or placed upon separate level.

This application is a division of application Serial No. 755,837, filed December 15, 1924.

What is claimed is:

1. A liquid treatment apparatus, comprising in combination, a slaking compartment, a diluting means, feeding apparatus for supplying lime to the slaking compartment, supply apparatus for delivering water to the slaking compartment and diluting means, regulating means for automatically controlling the feeding and supply mechanisms, and means for feeding the diluted mixture to the liquid to be treated.

2. A liquid treatment apparatus, comprising in combination, a slaking compartment, a diluting means, feeding apparatus for delivering lime to the slaking compartment, supply apparatus for delivering water to the diluting means and slaking apparatus regulating apparatus for automatically controlling the said feeding and supply apparatus, means for delivering refuse from the apparatus, and means for feeding the diluted mixture to the liquid to be treated.

3. A liquid treatment apparatus, comprising in combination, a slaking compartment, means for diluting the effluent from the slaking compartment, feeding apparatus for delivering lime to the slaking compartment, supply apparatus for delivering water to the slaking compartments and diluting means, means for delivering material from the slaking compartment to the diluting means, regulating means for controlling the feeding and supply apparatus, and means for feeding the diluted mixture to the liquid to be treated.

4. A liquid treatment apparatus, comprising in combination, a slaking compartment, a diluting apparatus, agitators effective to move material progressively in said compartment, feeding apparatus for delivering lime and liquid to said compartment and the mixture to said apparatus, regulating means for controlling said feeding apparatus, and means for feeding the diluted mixture to the liquid to be treated.

5. A liquid treatment apparatus, comprising in combination, a slaking compartment, diluting apparatus having an outlet for liquid, means for delivering material from the slaking to the diluting apparatus, feeding apparatus for delivering lime to the slaking compartment, supply apparatus for delivering water to said compartment and apparatus, regulating means for controlling the feeding and supply apparatus, and means for feeding the diluted mixture to the liquid to be treated.

6. A liquid treatment apparatus, comprising in combination, a slaking compartment, a diluting apparatus, supply means for delivering water to the slaking compartment and diluting apparatus, feeding means for delivering lime to the slaking compartment, transfer means for delivering material from the slaking compartment to the diluting apparatus at the rate of its delivery to the former, regulating means for controlling the feeding and supply means, and means for feeding the diluted mixture to the liquid to be treated.

7. A liquid treatment apparatus, comprising in combination, a slaking compartment, a diluting apparatus, means for delivering material from the former to the latter, said diluting apparatus having a liquid discharge, feeding means for delivering lime to the slaking compartment, supply means for delivering water to the slaking compartment and diluting apparatus, regulating means for controlling operation of the delivering means, and means for feeding the diluted mixture to the liquid to be treated.

8. Liquid treating apparatus comprising, in combination, a slaking compartment, a diluting apparatus having a discharge effective to discharge liquid at the rate material is supplied to the apparatus, feeding means for supplying lime to the slaking compartment, supply means for delivering water to the slaking compartment and diluting apparatus, and transfer means for delivering material from the slaking compartment to the diluting apparatus.

9. In water treatment apparatus, the combination of a slaking compartment, a diluting apparatus, means for delivering material from one to the other, means for delivering lime and water to the slaking compartment, said diluting apparatus and said slacking compartment comprising a mixing compartment means for discharging refuse from the mixing compartments, and an arrangement for discharge of liquid from the mixing compartment.

10. A liquid treating apparatus of the class described, comprising the combination of a tank, means for feeding water and lime into the tank in proportionate quantities for slaking per unit of time, agitating means for effecting progressive movement of the material in the tank, means for discharging the mixture from the tank into another tank at substantially the same rate as the supply, means for supplying water to the discharged mixture at a sufficient rate to form a diluted mixture, agitating means in said second tank, means for separating refuse from the diluted mixture, means for agitating the diluted mixture to maintain the lime in uniform suspension, and means for supplying said last mentioned mixture to a flowing stream of water to be treated.

11. In water treating apparatus of the class described, the combination of a tank, adjustable means for feeding lime and water into one end thereof at a proportionate rate for slaking, agitating means in the tank, means for discharging the mixture from the other end of the tank at substantially the same rate as the supply, means for supplying water to the discharged mixture to form a diluted mixture, means for discharging refuse from the tank while the apparatus is in operation, and means for supplying said last mentioned mixture to a flowing stream of water to be treated.

12. Water treating apparatus of the class described, comprising the combination of a tank, adjustable means operating to supply water and lime at a proportionate rate for slaking, agitating means for expediting the mixture of lime and water, means for discharging the resulting mixture into another tank, agitating means in said second tank, a refuse separator and means for supplying water to the discharged mixture to dilute the same, said several elements operating concommitantly to produce a continuous supply of the diluted mixture, and means for supplying said last mentioned mixture to a flowing stream of water to be treated.

13. In liquid treating apparatus of the class described, the combination of a tank, means for delivering lime and water into said tank in proper proportions to hydrate the lime and form a plastic mixture, means for removing the plastic mixture to a diluting apparatus, means for supplying water to the removed mixture in proportion adequate to form a liquid mixture, said elements being so arranged as to operate concomitantly to provide a continuous and substantially constant supply of the liquid mixture, and means for supplying said last mentioned mixture to a flowing stream of water to be treated.

14. Water treating apparatus of the class described, comprising in combination, a slaking compartment, a reservoir for milk of lime, means for supplying proportionate quantities of lime and water into the said compartment, means for delivering material from the slaking compartment to the reservoir at the rate it is supplied to the compartment, means for supplying water to the mixture delivered from the slaking compartment whereby to form milk of lime, agitating means in said compartment and in said reservoir, means for removing refuse from the milk of lime in the reservoir, and means for supplying said last mentioned mixture to a flowing stream of water to be treated.

15. Water treating apparatus of the class described comprising, in combination, a slaking compartment, a reservoir for milk of lime, agitating means in said compartment and in said reservoir, means for supplying proportionate quantities of lime and water into the said compartment, means for delivering material from the slaking compartment to the reservoir at the rate at which it is supplied to the former, means for supplying water to the mixture delivered from the slaking compartment whereby to form milk of lime, means for removing refuse from the milk of lime, means for measuring the milk of lime from the reservoir, and means for supplying said last mentioned mixture to a flowing stream of water to be treated.

16. In an apparatus for softening water, a mixing compartment, means for supplying water and lime to the compartment in predetermined proportions, a diluting means, means for transferring the original mixture from the first mentioned compartment to the diluting means and means for adding additional water to the lime mixture in the diluting means to form milk of lime, and means for supplying said last mentioned mixture to a body of water to be treated in the desired proportions.

17. In an apparatus for softening water, a mixing compartment, means for supplying water and lime to said compartment in predetermined ratio, agitating means in said compartment, a diluting means, means for transferring the initial lime mixture from the first mentioned compartment to the diluting means and means for adding additional water to the lime mixture in the diluting means to form milk of lime, and means for supplying said last mentioned mixture to a flowing body of water to be treated.

18. In an apparatus for softening water, a slaking compartment, means for supplying water and lime to the slaking compartment, a diluting means, means comprising rotary dipping cups for transferring the slaked lime from the first compartment to the diluting means, means for adding additional water to the lime mixture in the diluting means, and means for supplying said last mentioned mixture to a body of water to be treated.

19. In an apparatus for softening water, a slaking compartment, means for supplying water and unslaked lime to the slaking compartment, a diluting means, means for transferring the slaked lime from the slaking compartment to the diluting means, means for adding additional water to the slaked lime as it is being transferred to the diluting means to form milk of lime, and means for supplying said last mentioned mixture to a flowing body of water to be treated.

20. In a water treater, in combination, a tank, adjustable means for feeding unslaked lime into said tank, adjustable means for feeding water into said tank, means for mixing said unslaked lime and water, whereby said lime is slaked, a raw water supply system, means for adding the slaked lime to said system, means responsive to variations in the rate of flow of raw water through said system for adjusting said lime feeding means and said water feeding means, and means for providing a substantial interval between the mixture of said unslaked lime and water and the addition of said mixture to said system.

21. In a water treating device, in combination, a tank, adjustable means for feeding unslaked lime into said tank, adjustable means for feeding water to said tank, means for mixing said unslaked lime and said water, whereby said lime is slaked, a raw water supply system, means for adding the mixture of slaked lime and water to said system, at substantially the rate of production of said mixture, means responsive to variations in the rate of flow of raw water through said supply system for adjusting said lime feeding means and said water feeding means, and means for providing a substantial interval between the mixture of said unslaked lime and said water and the addition of said mixture to the raw water supply system.

In testimony whereof I have hereunto subscribed my name.

WALTER H. GREEN.